United States Patent [19]

Modiri et al.

[11] Patent Number: 5,630,140
[45] Date of Patent: May 13, 1997

[54] ORDERED AND RELIABLE SIGNAL DELIVERY IN A DISTRIBUTED MULTIPROCESSOR

[75] Inventors: Ramin Modiri; Srinivasa D. Murthy; Alan L. Rowe, all of San Jose, Calif.

[73] Assignee: Tandem Computers Incorporated, Cupertino, Calif.

[21] Appl. No.: 377,387

[22] Filed: Jan. 23, 1995

[51] Int. Cl.$^6$ .................................................. G06F 13/14
[52] U.S. Cl. .................. 395/726; 364/231.6; 364/230.1; 364/DIG. 1
[58] Field of Search ........................ 395/800, 726, 395/478, 479, 732, 860, 862, 879, 182.16; 364/231.6, 230.1, DIG. 1

[56] References Cited

U.S. PATENT DOCUMENTS

| | | | |
|---|---|---|---|
| 4,216,528 | 8/1980 | Robertson | 364/468.01 |
| 4,228,496 | 10/1980 | Katzman et al. | 395/308 |
| 4,384,338 | 5/1983 | Bennett | 395/163 |
| 4,682,217 | 7/1987 | David et al. | 395/125 |
| 4,718,002 | 1/1988 | Carr | 395/200.06 |
| 4,751,634 | 6/1988 | Burrus | 395/883 |
| 4,760,521 | 6/1988 | Rehwald et al. | 395/433 |
| 4,937,733 | 6/1990 | Gillett, Jr. et al. | 395/288 |
| 4,965,719 | 10/1990 | Shoens et al. | 395/650 |
| 4,984,153 | 1/1991 | Kregness et al. | 395/479 |
| 5,109,330 | 4/1992 | Pfeiffer | 395/478 |
| 5,191,652 | 3/1993 | Dias et al. | 395/200.08 |
| 5,214,776 | 5/1993 | Bagnoli et al. | 395/800 |
| 5,226,143 | 7/1993 | Baird et al. | 395/472 |
| 5,243,596 | 9/1993 | Port | 370/94.1 |
| 5,301,290 | 4/1994 | Tetzlaff | 395/469 |
| 5,317,739 | 5/1994 | Elko | 395/650 |
| 5,339,427 | 8/1994 | Elko et al. | 395/726 |
| 5,341,510 | 8/1994 | Gillett, Jr. et al. | 395/800 |
| 5,404,501 | 4/1995 | Carr | 395/182.16 |
| 5,408,629 | 4/1995 | Tsuchiya et al. | 395/478 |
| 5,423,044 | 6/1995 | Sutton et al. | 395/726 |
| 5,442,763 | 8/1995 | Bartfai et al. | 395/375 |
| 5,454,108 | 9/1995 | Devarakonda et al. | 395/650 |
| 5,524,255 | 6/1996 | Beard et al. | 395/800 |

OTHER PUBLICATIONS

Portable Operating System Interface, Part I ("POSIX") International Standard ISO/IEC9945-1: 1990; IEEE Std. 1003.1-1990, pp. 51-63 and 226-7.

*Primary Examiner*—Eric Coleman
*Attorney, Agent, or Firm*—Townsend and Townsend and Crew; Larry Mendenhall

[57] ABSTRACT

An apparatus and method, using an inter-processor lock to coordinate signal delivery to a process group whose member processes are distributed across multiple processors. The apparatus and method insure that each process group member process receives the same signals in the same order and that no signal is duplicated. The apparatus and method also insure that a partially completed signal delivery is completed even in the face of failure of the signalling processor.

42 Claims, 3 Drawing Sheets

ORDERED AND RELIABLE SIGNAL DELIVERY IN A DISTRIBUTED MULTIPROCESSOR

BACKGROUND OF THE INVENTION

The present invention relates to inter-process signalling. An understanding of certain inter-process operations, described below, is necessary in order to understand the invention. UNIX™ is taken as an example.

Recent years have seen a significant rise in the commercial popularity of the UNIX™ operating system. Although UNIX™ was originally preferred only by computer scientists, computer science students and other extremely technically proficient computer users, the preference for UNIX™ as a commercial programming environment is growing as those students matriculate into the work force and carry their developed preferences with them. Accordingly, it behooves a computer manufacturer to provide a UNIX™ or UNIX™-like programming environment along with its proprietary hardware.

However, UNIX™ has historically been an operating system for uniprocessors: originally the Digital Equipment Corporation's PDP-11, later mainframes, and still later microprocessors with the boom in microcomputers. Even today, only a handful of multiprocessor implementations of UNIX™ exist. The assignee of this invention, Tandem Computers Incorporated, is preparing to offer for sale one such multiprocessor implementation under the product name NonStop Kernel Software ("NSK"), release D30.00. The UNIX™-like portion of NSK is referred to as the Open System Services, "OSS," for short.

In UNIX™, a "process" is the dynamic, run-time embodiment of a program. The program typically resides in a static state on a storage medium such as disk or tape, while the process is loaded into memory and is executing. UNIX™ is a multitasking operating system: Many processes can be executing essentially simultaneously.

In UNIX™, a process can create another process by performing the fork() system call. The result of a fork() system call is the creation of a new process which is a copy of the old process, except inter alia it has its own unique process identification number. This procedure of a process creating a copy of itself is called "forking."

A process can also "exec," that is, a process can change the program code which it is running by reading in a new program—again typically from disk or tape—overlaying its old program with this new program, and executing the new program from the beginning. A process can accomplish this by calling the exec() system call.

In forking, the older process is called the "parent" and the newer process is called the "child." Of course, a parent can have many children, while a child has only one parent. UNIX™, however, allows processes to maintain other inter-process relationships, such as the process group relationship. Each process is a member of a process group. The default process group of a process is the process group of its parent. A process can change its process group by executing the appropriate system call, typically setpgid(). Accordingly, a child process can choose to be in the same process group as its parent or some other process group. A process group may have one or more processes as members.

Process group membership is important because the occurrence of an event within the system may need to be communicated to multiple processes. The process group can identify every process which is to be notified of the event.

To take a standard example, suppose a user logs onto a UNIX system. The "login" process by which the user first communicates with the system has a process group. The login process typically execs a command interpreter (a "shell") to enable the user to execute shell commands and programs. The shell's executing a program entails forking and then execing the program, as described above. Thus, the newly executed program will have the same process group as the shell, its parent. In fact, any program executed by the shell, its children, its grandchild, etc. will have the same process group by default. Now, if the communication line between the user and the shell is broken, intentionally or otherwise, then the preferred action is for the shell and each process which has the shell as an ancestor to be notified of that event and to terminate itself. (The termination of a process is referred to as "exiting." Exiting occurs as a result of calling the exit() system call.)

The mechanism in UNIX™ for notifying processes of asynchronous events is called signalling. Processes can send each other signals, using the kill() system call. The operating system itself may send signals to processes. A process or the operating system may send a process group a signal. Sending a signal is referred to as signalling.

From the above, it is apparent that UNIX™'s traditional multi-threading paradigm allows for essentially asynchronous modification of inter-process relationships, e.g., through forking and exiting. However, with such asynchronous inter-process relationship modifications, the question arises, how does a UNIX™ operating system guarantee atomic and ordered modifications of inter-process relationships?

Also apparent from the above is that UNIX™'s traditional multi-threading paradigm allows for asynchronous modification of inter-process relationships while signalling occurs. For example, how does a system guarantee atomic, ordered delivery of signals in the presence of forking? A specific example of the signalling problem is presented in POSIX, discussed below, at section B.3.1.1.

In the historical single-processor UNIX™ implementations, the asynchronicity of inter-process relationship modification and signalling did not present a significant problem with respect to atomicity and ordering. An implementation of a call to modify an inter-process relationship could involve an uninterruptable (at least at the crucial stage) access to the underlying kernel. Thus, the inter-process relationship modification could be performed on behalf of one process while another process desiring to modify inter-process relationships would be locked out.

Likewise, a call to kill() would result in a single pass through the kernel wherein the kernel generates a signal on behalf of one process and substantially simultaneously delivers that signal to all processes in the signalled process group. While the kernel is performing the mechanics of signalling, it can exclude from execution any processes which would simultaneously modify process group memberships.

The problems of atomic and ordered modification of inter-process relationships and atomic, ordered delivery of signals are much more intractable in multiprocessor implementations of UNIX™. Also, multiprocessor environments raise the question of reliability: how does the multiprocessor system insure consistent inter-process relationships in the presence of a failing processor or processors? How does the multiprocessor guarantee reliable delivery of signals when processors fail? One of the facts of multiprocessor systems—at least non-shared memory multiprocessors— which increase the intractability of the atomicity, ordering and reliability problems is that the processes in a process group can be and usually are distributed over more than one processor. The uniprocessor solution of having the kernel resolve any potential timing conflicts by single-threading is unavailable in the multiprocessor environment: There are multiple kernels, operating asynchronously, and on each kernel are multiple processes, each running asynchronously. Acting independently, each processor can only insure the reliable and ordered modification of inter-process relationships on that processor. For example, on a first processor a first process may be generating a signal for delivery to a process group. The process group has processes including the first process and a second process on a second processor. At the same time that the first process is generating a signal for the process group, the second process is forking a third process, which will also be a member of that process group for a limited time and then change its process group membership. Does the third process receive the signal generated by the first process or not? Thus, the much-desired paradigm of the multiprocessor system being simply a more powerful or faster version of the uniprocessor system begins to disintegrate. Without a resolution of these atomicity, ordering and reliability problems, the multiprocessor system cannot offer the same services as a uniprocessor UNIX™ system implementing signalling. In particular, a multiprocessor system cannot offer the full system services detailed in POSIX.

In fact, the problem has been so intractable in multiprocessor systems as to cause such hardware vendors to offer software products without a solution. The LOCUS TNC, MACH, OSF1, and ISIS implementations are described in turn below. Locus has a product called LOCUS TNC. LOCUS TNC implements a UNIX™ distributed system, based on a "vproc" abstraction. A vproc is a data structure which only refers to a process. Copies of a single vproc may exist in the memories attached to many processors. An "owning" or "master" processor describes the actual process with a non-referring data structure. At an overview level, the vproc abstraction allows the processors which have vprocs to be out-of-step with the master copy, and the local copy is used for some operations. Thus the system saves the expense of some messages between the master processor and a modifying vproc processor. It is believed that LOCUS TNC does not correctly deal with the atomicity, ordering and reliability conditions described above.

MACH, available from International Business Machines of Armonk, N.Y., and OSF1, available from the Open Software Foundation, Cambridge, Mass., are also a multiprocessor UNIX™ implementation. The MACH/OSF1 solution involves a "UNIX™ server," a single, multi-threaded process which maintains process relationships. This process is not distributed. There is only a single copy. Thus, it does not address the distributed algorithm discussed here.

ISIS solves a similar set of problems for message ordering and process group membership—but using a different definition of a "process group" and not for signalling. ISIS does not attempt to implement UNIX™-like semantics.

There are no known implementations of atomic, ordered and reliable modification of inter-process relationships or signal delivery in a distributed processor system, particularly in a multiprocessor system without shared memory. Indeed, prior to the pending release of NSK with OSS, Tandem Computers Incorporated did not offer such features in its UNIX™-like operating system software.

Along with ancestry and process groups memberships, another UNIX™ inter-process relationship is the "session."

A session is a collection of process groups, allowing users to selectively suspend the execution of processes and resume their execution at a later point. Each process group is a member of a session, and a process is a member of the session of which its process group is a member.

There are other inter-process relationships in UNIX™, the mentioned three are simply the primary ones. The primary ones suffice, however, to illustrate that certain UNIX™ functions operate on individual processes or process groups, sessions or other inter-process relationships. In a multiprocessor environment, the simultaneous, asynchronous operations manipulating these inter-process relationships can create numerous race conditions as the processes on various processors modify distributed data structures.

SUMMARY OF THE INVENTION

Accordingly, one object of this invention is a reliable implementation of a UNIX™-like signalling functionality wherein signals arriving at a process group do so at some consistent state of the process group, particularly when the process group membership would otherwise be changing as a result of operations such as process creation, process group changing and process termination.

Another goal of this invention is a reliable implementation of UNIX™-like signalling functionality wherein, when multiple processes send process group signals to a process group, all the signals from each distinct signaller arrive at all members of the process group either entirely before or entirely after those sent by every other signaller. Each member of the process group sees the same signals coming in in the same order.

Yet another goal of the invention is a reliable implementation of UNIX™-like signalling functionality in a multiprocessor system without shared memory, wherein, if a processor on which a signalling processor resides fails during the signalling operation, the signalling operation either fails completely, with the signal delivered to no surviving process or completes, with the signal delivered to all surviving process group members.

Still another object of the invention is a reliable implementation of UNIX™-like signalling functionality in a multiprocessor system, wherein if one or more of the processors fail during a signalling operation to a process group spread across multiple processors, the signal shall arrive at all surviving members of the process group.

These and other objects of the invention will be readily apparent on the reading of the disclosure below.

Accordingly, hereinbelow is described a multiprocessor implementation of a UNIX™-like operating system wherein any process desiring to signal another process must enter arbitration for an inter-processor lock maintained by a controlling processor.

If the desiring processor succeeds in acquiring the inter-processor lock, the processor then informs each processor—in a predetermined sequence—of the signal. The desiring processor then releases the inter-processor lock.

If the desiring processor fails in acquiring the inter-processor lock, the desiring processor delays before entering into arbitration again. Typically, the desiring processor will run such processes as do not require the inter-processor lock while it is waiting to re-enter arbitration.

Each processor to which a signal is delivered will deliver the signal to the appropriate, if any, process on that processor.

Each receiving processor, once it has received the incoming signal, operates asynchronously from all other processors. Each receiving processor's pre- or post-signal actions need not be and are not coordinated with the actions of any other processor.

On failure of a signalling processor which has not acquired the inter-processor lock, no recovery is necessary to insure consistency of the particular distributed data structures. On failure of a signalling processor which has acquired the inter-processor lock, the controlling processor takes over the function of informing all of the receiving processors of the signal.

On failure of the controlling processor, the surviving processors follow a pre-determined procedure to determine which of the surviving processors succeeds to be the controlling processor.

DESCRIPTION OF THE PREFERRED EMBODIMENT

Figure 1:
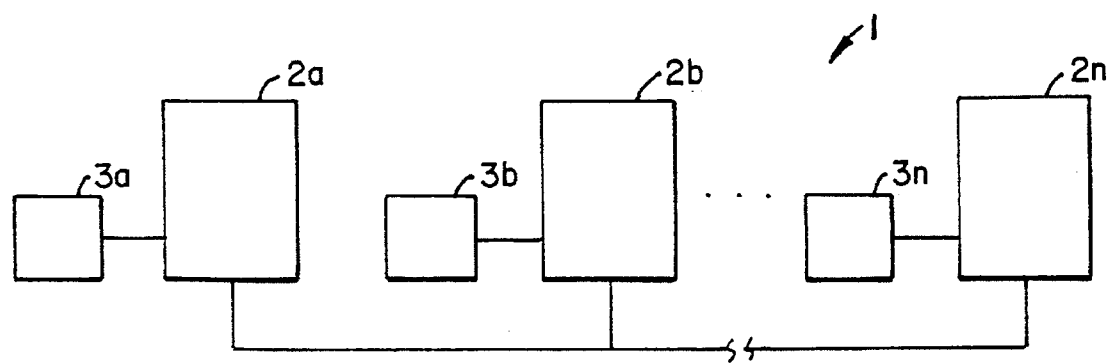
FIG. 1 is a schematic of the multiprocessor system of the invention.

FIG. 1 shows the multiprocessor system 1 having processors $2a, 2b, \ldots, 2n$. N is typically sixteen, though N may be larger or smaller than sixteen. Each processor 2 is coupled to a respective memory 3.

Each processor 2 runs operating system software. In the preferred embodiment, the processors 2 all run the same operating system software. The underlying operating system G is the Guardian, available from Tandem Computers Incorporated and the overlaying operating system is NSK with OSS, an implementation of the Portable Operating System Interface, Part I ("POSIX," International Standard ISO/IEC 9945-1: 1990; IEEE Std 1003.1-1990, incorporated herein by reference). OSS is herein considered a variant of UNIX™.

Figure 2:
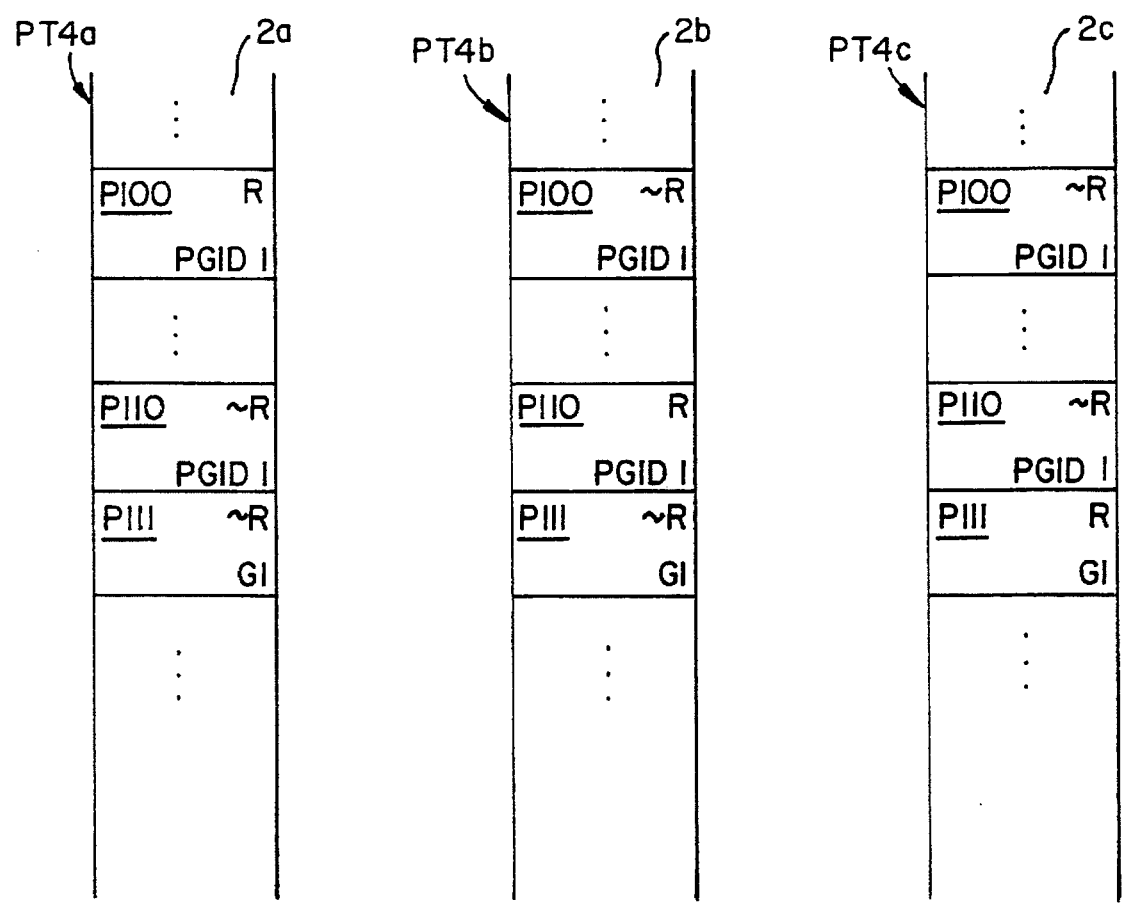
FIG. 2 is a simplified diagram of the state of processes in the multiprocessor system of the invention.

As a result of running UNIX™, each processor 2 has processes P. As is the paradigm in UNIX™ systems, processes fork children, who in turn fork, creating their own children, and so on. In the preferred embodiment of the multiprocessor system 1, a process on processor $2a$ can create a child which runs on $2a$ or on some one of processors $2b, 2c, \ldots, 2n$. FIG. 2 illustrates the processes in multiprocessor system 1 at time t0. Processors $2a, 2b$ and $2c$ are represented by their respective process tables PT4$a$, PT4$b$ and PT4$c$. The process tables PT4 are an example of an inter-process relationship distributed data structure. A process table is the cumulative tables which define UNIX™ process relationships. The process table is the system resource where each extant process on a processor resides.

Process P100 resides (R) on processor $2a$. Process P100 is the parent of process P110, not residing ($\bar{R}$) on processor $2a$ but on processor $2b$. Process P110 in turn is the parent of process P111 on processor $2c$. The process group of process P100 is process group G1. As explained above, the process group of process P110 is by default the process group of its parent, process P100. Similarly, the process group of process P111 is the process group of its parent, P110. Each of processes P100, P110 and P111 is in process group G1.

Figure 3:
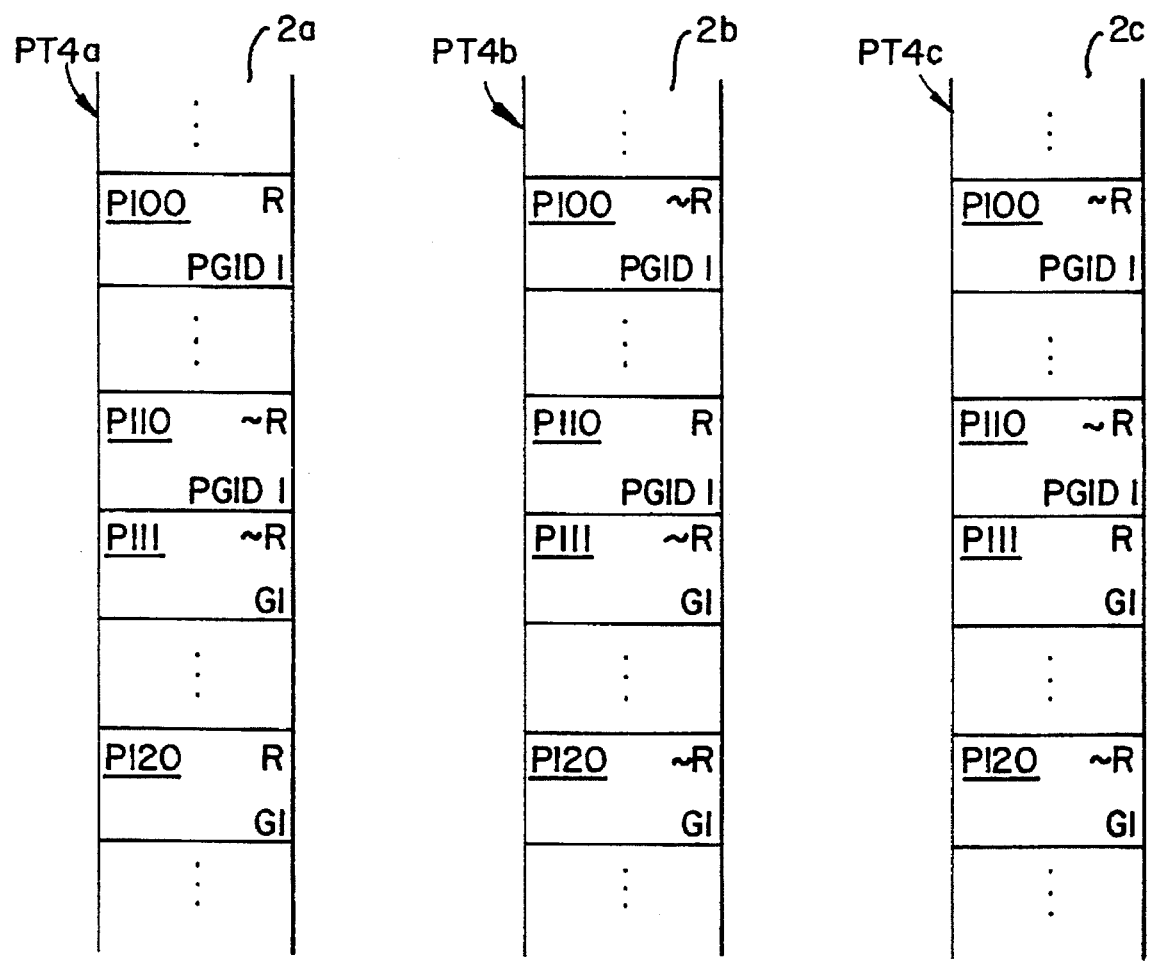
FIG. 3 is a simplified diagram of the state of processes in the multiprocessor system of the invention.

Consider the several scenarios explained below. The first scenario is illustrated in FIG. 3. FIG. 3 shows a subset of the processes existing in multiprocessor system 1 at a time t1. At time t1, t1>t0, process P100 has spawned a second child, process P120. Process P120 is born with the process group of its parent, process P100.

Figure 4:
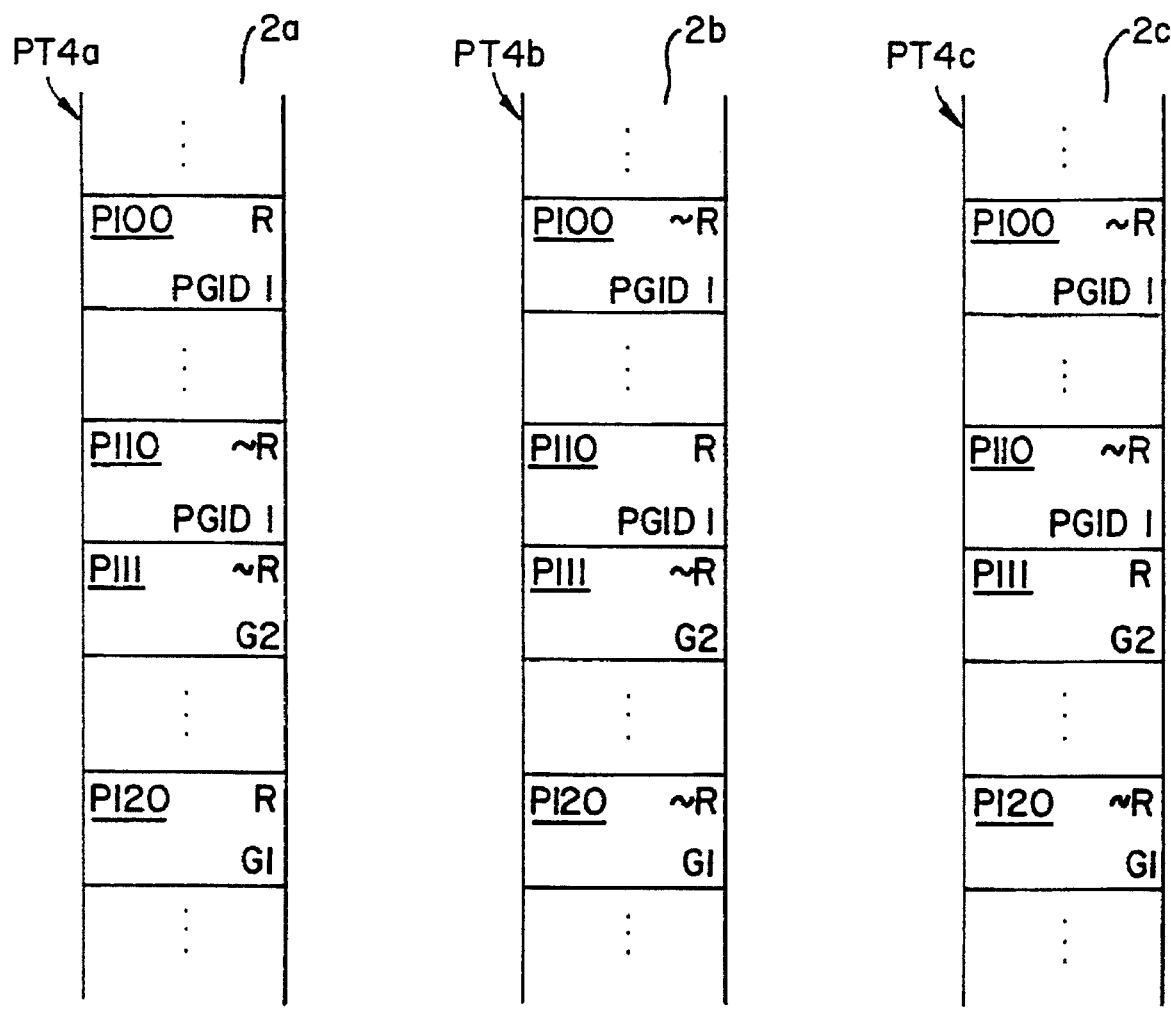
FIG. 4 is a simplified diagram of the state of processes in the multiprocessor system of the invention.

The second scenario is illustrated in FIG. 4. FIG. 4 shows that at time t2, t2>t1>t0, process P111 has elected to change its process group membership from G1 to G2. Accordingly, process group G1 at time t2 includes processes P100, P110 and P120. Process group G2 includes only process P111.

As is typical in UNIX™ systems, process P110 may wish to send a signal to each process P in its process group G. If process P110 sends the signal at time t2, while P111 is changing its process group membership, then there is uncertainty as to whether process P111 will receive the signal. Depending on whether the kill() or setpgid() wins the race, the signal will be delivered to processes P100, P110, P111 and P120 or to only processes P100, P110 and P120. Process P111 may or may not receive the signal.

The source of this nondeterminism is that the receiving processor $2c$ is operating independently of the signalling processor $2b$. Even though processors $2b$ and $2c$ are not performing the same operation (processor $2b$ is performing a signal() while processor $2c$ is performing a setpgid()), the underlying data structure affected in both operations is the process table, PT. A copy of which is maintained in memory 3 of each processor 2.

Race conditions will also arise when the competing functionalities are both inter-process relationship modifications. For example, setpgid() is defined to work on a target child process only if that child has not performed an exec() call. Suppose a setpgid() call is issued at the same time a child issues an exec() call. Either the exec should appear to occur first (and the setpgid() fail), or the setpgid() should occur first and the exec() occur later with the new group-id installed.

In U.S. Pat. No. 4,718,002 (1988), Carr describes a method for communicating updated information among processors in a multiprocessor system such as system 1, a global update procedure ("GLUPP"). Carr sought to improve upon its prior art single-fault tolerant systems by creating a system tolerant of multiple failures. U.S. Pat. No. 4,718,002 is incorporated herein by reference.

GLUPP is loosely described below. GLUPP doubly orders processors 2. The first ordering is the agreed-upon and universally known sequence in which processors 2 will receive a global update message. The second ordering is the agreed-upon and universally known succession of processors as control processor, should the original control processor (the first processor in the second ordering) fail. Each of the two GLUPP orderings is actually a loop.

Certain distributed, critical data structures are protected by a global update lock ("GLUPP lock"). Any processor 2 which desires to change any such distributed, critical data structure must first acquire the GLUPP lock. The control processor is the sole processor which maintains the lock; it mediates the granting of and denial of the GLUPP lock.

While Carr addresses communicating updates to distributed data structures in the face of a threat of processor failure, the present invention addresses race conditions inherent in asynchronous, competing processors modifying inter-process relationships and asynchronous, competing processors modifying such relationships and signalling about the same time. As modified to implement UNIX™-style inter-process relationships modification and signalling, GLUPP requires a processor to acquire the GLUPP lock if that processor wishes to modify any inter-process relationship which another processor may contemporaneously modify. The GLUPP lock must also be acquired for operations which can affect the process grouping upon which signalling depends. Accordingly, any processor which has generated a signal for delivery to other processes, and which must therefore access the distributed process table PT4, must first acquire the GLUPP lock from the control processor. That is to say, signalling processor $2b$ in the above example must acquire the GLUPP lock in order to signal the processes P in process group G1. (In acquiring the GLUPP lock, a process 2 transmits to the control processor a copy of the global update message to be transmitted with the help of the GLUPP lock. The control processor maintains that copy of the global update message in its global update message memory. This copy in the global update message memory is used as described below.)

Likewise, any process which seeks to fork must first acquire the GLUPP lock from the control process. Forking requires access to the distributed process table PT4: process table PT4 is the residence of processes in system 1 running UNIX™. Therefore, process P111 must acquire the GLUPP lock before changing its process group membership at time t2.

As a consequence of the modified GLUPP related above, the membership of process group G1 is determined at the time of the signalling. Because either the signalling processor $2b$ or the group-changing processor $2c$ must acquire the GLUPP lock first—and thus the other of the two must wait—the delivery of signals is causally ordered.

Accordingly, the above disclosure describes an implementation of UNIX™-like signalling wherein a signal arrives at a process group at some consistent state of the process group, even when other processors are attempting to change the group membership while the signal's delivery is occurring. The consistent state of the process group is the process group at the time the signalling processor acquires the GLUPP lock. Other processors may then attempt to fork, change process groups or otherwise modify process group memberships, but will wait on the GLUPP lock before doing so. The GLUPP lock will become available again only when the signalling processor has completed its necessary accesses to the distributed process table. Group membership changes and signal delivery are guaranteed to occur in a particular order, and that order will be the same in all processors.

In the modified global update procedure of this invention, a signalling processor signalling group G must notify every other available processor of the signal(s) to be delivered to the processes, if any, who are a member of process group G on that other available processor. Once the signalling processor has acquire the GLUPP lock, the signalling processor sends a global update message packet reflecting the signalling to each available processor in the order specified by the first ordering mentioned above. Thus, when at time $t3>t2$ signalling process P110 wishes to send a signal S1 and S2 to process group G1 and signalling process P111 also wishes to send a signal S3 to process group G1, one of processor $2b$ or $2c$ will acquire the GLUPP lock. Assuming that processor $2c$ wins the arbitration for the GLUPP lock, then processor $2c$ will notify each of receiving processors $2a, 2b, 2c, \ldots, 2n$. Processor $2c$ will notify the processors in the order specified in the global update message ordering. The global update message sent to each processor will reflect the signalling of process group G with signal S3. As the global update procedure requires, each receiving processor must send an acknowledgement of the global update message. On receipt of an acknowledgement from one receiving processor in the global update message ordering, signalling processor $2c$ sends the global update message to the next processor in the global update message ordering. In the degenerative case, signalling processor $2c$ notifies itself of the signals. In the non-failure case, the acknowledgement of receiving processor 2 indicates that that processor 2 has delivered the signal S3 represented in the global update message packet to each process, if any, in process group G1 on the receiving processor 2. If the receiving processor is processor $2a$, then each of processes P100 and P120 will have received S3 at the time processor $2a$ acknowledges the global update message from signalling processor $2c$. If the receiving processor is $2c$, then no processes on processor $2c$ will have received the signal S3 at the time processor $2c$ acknowledges the global update message from signalling processor $2c$.

Once signalling processor $2c$ has distributed the global update message representing the sending of signal S3 to process group G1, then processor $2c$ releases the GLUPP lock. Signalling processor $2b$ now arbitrates for the lock in order to send signals S1 and S2. Following the same modified GLUPP, signalling processor $2b$ delivers signals the global update message representing the sending of signals S1 and S2 to process group G.

As the above shows, each of the processes P100, P110 and P120 which compose process group G1 receives signal S3 first and then receives signals S1 and S2.

Accordingly, the above disclosure describes a UNIX™-like implementation of signalling wherein, when multiple signalling processors send process group signals to a process group G, all the signals from each signalling processor arrive at all members of process group G either before or after those sent by every other signalling processor. The process group members always see the same incoming signals in the same order.

In the modified GLUPP, when the control processor determines that a processor 2 has failed, the control processor checks whether a global update was in process, i.e., whether the GLUPP lock has been acquired by a signalling processor. The control processor need not perform any recovery if the GLUPP lock has not been so acquired.

However, when the GLUPP lock has been acquired, the control processor takes upon itself the task of sending the signal global update message to each processor. The control processor reconstructs, from its global update message memory, the signalling global update message which the signalling processor was delivering when it failed. The control processor then in effect becomes the signalling processor, sending the signal global update message to each processor in turn, according to the global update message ordering. Thus, if processor $2a$ desires to signal process G1 of signal S1 and if processor $2d$ (not shown) is the control processor, then processor $2a$ requests the GLUPP lock of control processor $2d$. On receipt of the request and if no other processor has already acquired the GLUPP lock, processor $2d$ copies the signalling global update message into its global update message memory and notifies signalling processor $2a$ that it has acquired the GLUPP lock. Assuming that the global update message ordering is $2a, 2b, 2c, \ldots 2n$, then signalling processor $2a$ first delivers the S1 signalling global update message to itself, and acknowledges to itself. Signalling processor $2a$ next sends the global update message to receiving processor $2b$, and processor $2b$ acknowledges. Again, to receiving processor $2c$, signalling processor $2a$ sends the global update message and waits for acknowledgement. Now, assuming that processor $2a$ fails before receipt of receiving processor 2c's acknowledgment. Then eventually the control processor 2d will detect the failure of processor 2a. Control processor 2d will then generate the S1 signalling global update message from its global update message memory. With that regenerated copy, control processor 2d in effect becomes the signalling processor. It walks through the global update message ordering and sends the global update message copy to each processor 2b, 2c, . . . , 2n in order. (Control processor 2d is aware that processor 2a is not available.)

Typically, UNIX™ processes are not capable of distinguishing how many of a certain type of signal are received. Accordingly, there is no need for a receiving processor 2 to reject a duplicate signalling global update message. In the preferred embodiment, however, receiving processors are adapted to reject duplicate global update messages. For example, each processor 2 maintains a unique global update message ID counter. These multiple counters can be synchronized on system start up. Each global update message distributed under the GLUPP lock includes the unique global update message ID from the originating processor 2, and each receiving processor 2 increments its unique global update message ID counter on receipt of a global update message whose ID matches the counter of the receiver processor 2. Now, when control processor 2d, in its role as signalling processor, delivers a duplicate signalling global update message to processor 2c, processor 2c can acknowledge but otherwise ignore the signalling global update message, since the global update message ID of the global update message and the corresponding ID in the global update message ID counter of processor 2b will not match. Similarly, processor 2c would ignore the duplicate signalling global update message from control processor 2d.

Accordingly, the above disclosure describes a UNIX™-like implementation of signalling wherein, if a signalling processor fails during the signalling operation, then the signals are either delivered to no process or are delivered to all surviving members of the process group: If the signalling process fails before acquiring the GLUPP lock, then the signalling action never takes place—not even on the signalling processor. If the signalling processor fails after acquiring the GLUPP lock and possibly after delivering a signal request to some of the receiving processors, then the GLUPP will retry sending the same signalling global update message using a surviving processor, until there are no surviving processors. Thus, the signalling processor can die, but a surviving processor will deliver the same signal to all other processors. The global message update ID allows each incoming request to be identified as "new" versus "seen and acted on." The duplicate requests are simply ignored. In short, a signal is never partially delivered or delivered twice to a process group.

In the modified GLUPP described herein, the failure of a receiving processor 2 is generally of no consequence. Since each processor is responsible only for delivering signals to processes P on that receiving processor 2, the failure of that receiving processor 2 will leave no tasks undone or unaccounted for, with one exception. If the receiving processor 2 which fails is the control processor, then significant tasks are left unaccounted for. Carr describes a procedure for failure of a locker processor in a multi-processing system performing global updates. That procedure will operate within this modified GLUPP context.

The above procedures suffice to cover any number of processor failures in system 1. Multiple processor failures can be broken down into a combination of the above scenarios.

Accordingly, the above disclosure describes a UNIX™-like implementation of signalling wherein if a receiving processor fails, it is of no consequence how far that receiving processor succeeded in delivering the signals to the process group members resident on that processor. A receiving processor is responsible for handling only the process group members which reside on that receiving processor.

The above description includes specifics which are by way of example rather than limitation. Modifications to the above apparatus and methods will be readily apparent to one of ordinary skill in the art and such modifications are a part of this invention.

What is claimed is:

1. A method for ordering the delivery of signals to a process in a distributed data processing system, the system having a plurality of distributed, interconnected processors, each of said processors having a memory, said method comprising:

ordering said plurality of processors;

establishing one of said plurality of processors as a control processor that maintains a global lock;

generating on a first signalling processor between or among (hereinafter, "among") said plurality of processors a first signal for delivery to said process;

generating on a second signalling processor among said plurality of processors a second signal for delivery to said process;

after said first step of generating, requesting of said control processor for said first signalling processor said global lock;

after said step of requesting, requesting of said control processor for said second signalling processor said global lock;

after said step of requesting for said first signalling processor, acknowledging to said first signalling processor that said first signalling processor has the global lock;

after said step of requesting for said second signalling processor, failing to acknowledge to said second processor that said second signalling processor has said global lock;

after said step of acknowledging, sending said first signal to each of said plurality of processors in order;

after said step of failing to acknowledge, refraining from sending said second signal to any of said plurality of processors;

after said step of sending, relinquishing said global lock to said control processor;

receiving said first signal;

then delivering said first signal to said process; and then delivering said second signal to said process.

2. The method of claim 1 wherein said first and second signalling processors are the same processor.

3. The method of claim 1 further comprising the steps of:

continuing said method at said step of delivering said second signal if said first signalling processor fails before said step of acknowledging completes; and sending said signal by means of said control processor if said first signalling processor fails after said step of acknowledging completes but before said step of sending completes.

4. The method of claim 1 wherein said step of sending comprises sending said signal to each remaining one of said plurality of processors if one of said plurality of processor other than said first signalling processor fails.

5. The method of claim 1 wherein said step of delivering said first signal comprises:

delivering said first signal to each process in a first subgroup of said group of processes existing on a respective first of said plurality of processors asynchronously from delivering said first signal to each process in a second subgroup of said group of processes existing on a respective second of said plurality of processors.

6. The method of claim 1 wherein said step of delivering said first signal comprises:

delivering said first signal to each process in a first subgroup of said group of processes existing on a respective first of said plurality of processors asynchronously from delivering said first signal to each process in any subgroup of said group of processes existing on the respective remainder of said plurality of processors.

7. The method of claim 1 wherein after said step of failing to acknowledge and before said step of delivering said second signal, the following steps are performed:

delaying and then requesting of said control processor for said second signalling processor said global lock;

then acknowledging to said second signalling processor that said second signalling processor has said global lock; and sending said second signal to the first of said plurality of processors in order.

8. The method of claim 1 further comprising the following steps:

ordering said plurality of processors for succession as said control processor;

selecting the first in order of succession as said control processor;

replacing said control processor with the next processor in order for succession if said control processor fails.

9. A method for ordering the delivery of signals to a group of processes in a distributed data processing system, the system having a plurality of distributed, interconnected processors, each of said processors having a memory, said method comprising:

ordering said plurality of processors;

establishing one of said plurality of processors as a control processor that maintains a global lock;

generating on a first signalling processor between or among (hereinafter, "among") said plurality of processors a first signal for delivery to said process group;

generating on a second signalling processor among said plurality of processors a second signal for delivery to said process group;

after said first step of generating a first signal, requesting of said control processor for said first signalling processor said global lock;

after said step of requesting for said first signalling processor, requesting of said control processor for said second signalling processor said global lock;

after said step of requesting for said first signalling processor, acknowledging to said first signalling processor that said first signalling processor has the global lock;

after said step of requesting for said second signalling processor, failing to acknowledge to said second processor that said second signalling processor has said global lock;

after said step of acknowledging, sending said first signal to each of said plurality of processors in order;

after said step of failing to acknowledge, refraining from sending said second signal to any of said plurality of processors;

after said step of sending, relinquishing said global lock to said control processor;

receiving said first signal;

then delivering said first signal to said process group; and then delivering said second signal to said process group.

10. The method of claim 9 wherein said first and second signalling processors are the same processor.

11. The method of claim 9 further comprising the steps of:

continuing said method at said step of delivering said second signal if said first signalling processor fails before said step of acknowledging completes; and sending said signal by means of said control processor if said first signalling processor fails after said step of acknowledging completes but before said step of sending completes.

12. The method of claim 9 wherein said step of sending comprises sending said signal to each remaining one of said plurality of processors if one of said plurality of processor other than said first signalling processor fails.

13. The method of claim 9 wherein after said step of failing to acknowledge and before said step of delivering said second signal, the following steps are performed:

delaying and then requesting of said control processor for said second signalling processor said global lock;

then acknowledging to said second signalling processor that said second signalling processor has said global lock; and sending said second signal to the first of said plurality of processors in order.

14. The method of claim 9 wherein said step of delivering said first signal comprises:

delivering said first signal to each process in a first subgroup of said group of processes existing on a respective first of said plurality of processors asynchronously from delivering said first signal to each process in a second subgroup of said group of processes existing on a respective second of said plurality of processors.

15. The method of claim 9 wherein said step of delivering said first signal comprises:

delivering said first signal to each process in a first subgroup of said group of processes existing on a respective first of said plurality of processors asynchronously from delivering said first signal to each process in any subgroup of said group of processes existing on the respective remainder of said plurality of processors.

16. The method of claim 9 further comprising the following steps:

ordering said plurality of processors for succession as said control processor;

selecting the first in order of succession as said control processor;

replacing said control processor with the next processor in order for succession if said control processor fails.

17. In a distributed data processing system, a method for ordering the delivery of a signal to a group of processes and a change of membership in said process group, the system having a plurality of distributed, interconnected processors, each of said processors having a memory, said method comprising:

ordering said plurality of processors;

establishing one of said plurality of processors as a control processor that maintains a global lock;

generating on a signalling processor between or among (hereinafter, "among") said plurality of processors a signal for delivery to said process group;

generating on a changing processor among said plurality of processors a change in membership of said process group;

after said step of generating a signal, requesting of said control processor for said signalling processor said global lock;

after said step of generating a change, requesting of said control processor for said changing processor said global lock;

after said step of requesting for said signalling processor, acknowledging to said signalling processor that said signalling processor has the global lock;

after said step of requesting for said changing processor, failing to acknowledge to said changing processor that said changing processor has said global lock;

after said step of acknowledging, sending said signal to each of said plurality of processors in order;

after said step of failing to acknowledge, refraining from changing said process group according to said change in membership;

after said step of sending, relinquishing said global lock to said control processor;

receiving said signal;

then delivering said signal to said process group; and then changing said process group according to said change in membership.

18. The method of claim 17 wherein said signalling and changing processors are the same processor.

19. The method of claim 17 further comprising the steps of:

continuing said method at said step of changing said process group if said signalling processor fails before said step of acknowledging completes; and sending said signal by means of said control processor if said signalling processor fails after said step of acknowledging completes but before said step of sending completes.

20. The method of claim 17 wherein said step of sending comprises sending said signal to each remaining one of said plurality of processors if one of said plurality of processor other than said signalling processor fails.

21. The method of claim 17 wherein after said step of failing to acknowledge and before said step of changing said process group, the following steps are performed:

delaying and then requesting of said control processor for said changing processor said global lock;

then acknowledging to said changing processor that said changing processor has said global lock; and sending said change to the first of said plurality of processors in order.

22. The method of claim 17, wherein said step of generating a change in membership comprises deleting a process from said process group.

23. The method of claim 17 wherein said step of delivering said signal comprises:

delivering said signal to each process in a first subgroup of said group of processes existing on a respective first of said plurality of processors asynchronously from delivering said signal to each process in a second subgroup of said group of processes existing on a respective second of said plurality of processors.

24. The method of claim 17 wherein said step of delivering said signal comprises:

delivering said signal to each process in a first subgroup of said group of processes existing on a respective first of said plurality of processors asynchronously from delivering said signal to each process in any subgroup of said group of processes existing on the respective remainder of said plurality of processors.

25. The method of claim 17 further comprising the following steps:

ordering said plurality of processors for succession ELS said control processor;

selecting the first in order of succession as said control processor;

replacing said control processor with the next processor in order for succession if said control processor fails.

26. The method of claim 17, wherein said step of generating a change in membership comprises adding a process to said process group.

27. The method of claim 26, wherein said step of deleting a process comprises changing the process group of a process in said process group.

28. In a distributed data processing system, a method for ordering the delivery of a signal to a group of processes and a change of membership in said process group, the system having a plurality of distributed, interconnected processors, each of said processors having a memory, said method comprising:

ordering said plurality of processors;

establishing one of said plurality of processors as a control processor that maintains a global lock;

generating on a signalling processor between or among (hereinafter, "among") said plurality of processors a signal for delivery to said process group;

generating on a changing processor among said plurality of processors a change in membership of said process group;

after said step of generating a signal, requesting of said control processor for said signalling processor said global lock;

after said step of generating a change, requesting of said control processor for said changing processor said global lock;

after said step of requesting for said changing processor, acknowledging to said changing processor that said changing processor has the global lock;

after said step of requesting for said signalling processor, failing to acknowledge to said signalling processor that said signalling processor has said global lock;

after said step of acknowledging, sending said change to each of said plurality of processors in order;

after said step of failing to acknowledge, refraining from sending said signal;

after said step of sending, relinquishing said global lock to said control processor;

receiving said change;

then changing said process group according to said change in membership; and then delivering said signal to said process group.

29. The method of claim 28 wherein said signalling and changing processors are the same processor.

30. The method of claim 28 further comprising the steps of:
continuing said method at said step of delivering said signal if said changing processor fails before said step of acknowledging completes; and
sending said change by means of said control processor if said changing processor fails after said step of acknowledging completes but before said step of sending completes.

31. The method of claim 28 wherein said step of sending comprises
sending said change to each remaining one of said plurality of processors if one of said plurality of processor other than said changing processor fails.

32. The method of claim 28 wherein after said step of failing to acknowledge and before said step of delivering said signal, the following steps are performed:
delaying and then requesting of said control processor for said signalling processor said global lock;
then acknowledging to said signalling processor that said second signalling processor has said global lock; and
sending said signal to the first of said plurality of processors in order.

33. The method of claim 28, wherein said step of generating a change in membership comprises deleting a process from said process group.

34. The method of claim 28 wherein said step of changing said process group comprises:
changing a first subgroup of said process group existing on a respective first of said plurality of processors asynchronously from changing a second subgroup of said process group existing on a respective second of said plurality of processors.

35. The method of claim 28 wherein said step of changing said process group comprises:
changing a first subgroup of said process group existing on a respective first of said plurality of processors asynchronously from changing any subgroup of said process group existing on the respective remainder of said plurality of processors.

36. The method of claim 28 further comprising the following steps:
ordering said plurality of processors for succession as said control processor;
selecting the first in order of succession as said control processor;
replacing said control processor with the next processor in order for succession if said control processor fails.

37. The method of claim 28, wherein said step of generating a change in membership comprises adding a process to said process group.

38. The method of claim 37, wherein said step of deleting a process comprises changing the process group of a process in said process group.

39. An article of manufacture comprising a medium for data storage wherein is located a computer program for causing a distributed data processing system having a plurality of distributed, interconnected processors to order the delivery of signals to a process by
ordering said plurality of processors;
establishing one of said plurality of processors as a control processor that maintains a global lock;
generating on a first signalling processor between or among (hereinafter, "among") said plurality of processors a first signal for delivery to said process;
generating on a second signalling processor among said plurality of processors a second signal for delivery to said process;
after said first step of generating, requesting of said control processor for said first signalling processor said global lock;
after said step of requesting, requesting of said control processor for said second signalling processor said global lock;
after said step of requesting for said first signalling processor, acknowledging to said first signalling processor that said first signalling processor has the global lock;
after said step of requesting for said second signalling processor, failing to acknowledge to said second processor that said second signalling processor has said global lock;
after said step of acknowledging, sending said first signal to each of said plurality of processors in order;
after said step of failing to acknowledge, refraining from sending said second signal to any of said plurality of processors;
after said step of sending, relinquishing said global lock to said control processor;
receiving said first signal;
then delivering said first signal to said process; and
then delivering said second signal to said process.

40. An article of manufacture comprising a medium for data storage wherein is located a computer program for causing a distributed data processing system having a plurality of distributed, interconnected processors to order the delivery of signals to a group of processes by
ordering said plurality of processors;
establishing one of said plurality of processors as a control processor that maintains a global lock;
generating on a first signalling processor between or among (hereinafter, "among") said plurality of processors a first signal for delivery to said process group;
generating on a second signalling processor among said plurality of processors a second signal for delivery to said process group;
after said first step of generating a first signal, requesting of said control processor for said first signalling processor said global lock;
after said step of requesting for said first signalling processor, requesting of said control processor for said second signalling processor said global lock;
after said step of requesting for said first signalling processor, acknowledging to said first signalling processor that said first signalling processor has the global lock;
after said step of requesting for said second signalling processor, failing to acknowledge to said second processor that said second signalling processor has said global lock;
after said step of acknowledging, sending said first signal to each of said plurality of processors in order;
after said step of failing to acknowledge, refraining from sending said second signal to any of said plurality of processors;
after said step of sending, relinquishing said global lock to said control processor;
receiving said first signal;

then delivering said first signal to said process group; and then delivering said second signal to said process group.

41. An article of manufacture comprising a medium for data storage wherein is located a computer program for causing a distributed data processing system having a plurality of distributed, interconnected processors to order the delivery of a signal to a group of processes and a change of membership in said process group by ordering said plurality of processors;

establishing one of said plurality of processors as a control processor that maintains a global lock;

generating on a signalling processor between or among (hereinafter, "among") said plurality of processors a signal for delivery to said process group;

generating on a changing processor among said plurality of processors a change in membership of said process group;

after said step of generating a signal, requesting of said control processor for said signalling processor said global lock;

after said step of generating a change, requesting of said control processor for said changing processor said global lock;

after said step of requesting for said changing processor, acknowledging to said changing processor that said changing processor has the global lock;

after said step of requesting for said signalling processor, failing to acknowledge to said signalling processor that said signalling processor has said global lock;

after said step of acknowledging, sending said change to each of said plurality of processors in order;

after said step of failing to acknowledge, refraining from sending said signal;

after said step of sending, relinquishing said global lock to said control processor;

receiving said change;

then changing said process group according to said change in membership; and then delivering said signal to said process group.

42. An article of manufacture comprising a medium for data storage wherein is located a computer program for causing a distributed data processing system having a plurality of distributed, interconnected processors to order the delivery of a signal to a group of processes and a change of membership in said process group by ordering said plurality of processors;

establishing one of said plurality of processors as a control processor that maintains a global lock;

generating on a signalling processor between or among (hereinafter, "among") said plurality of processors a signal for delivery to said process group;

generating on a changing processor among said plurality of processors a change in membership of said process group;

after said step of generating a signal, requesting of said control processor for said signalling processor said global lock;

after said step of generating a change, requesting of said control processor for said changing processor said global lock;

after said step of requesting for said signalling processor, acknowledging to said signalling processor that said signalling processor has the global lock;

after said step of requesting for said changing processor, failing to acknowledge to said changing processor that said changing processor has said global lock;

after said step of acknowledging, sending said signal to each of said plurality of processors in order;

after said step of failing to acknowledge, refraining from changing said process group according to said change in membership;

after said step of sending, relinquishing said global lock to said control processor;

receiving said signal;

then delivering said signal to said process group; and then changing said process group according to said change in membership.

* * * * *